(12) United States Patent  
Machida et al.

(10) Patent No.: US 12,459,818 B2  
(45) Date of Patent: Nov. 4, 2025

(54) METHOD FOR MANIPULATING FLAKE-LIKE MATERIAL AND METHOD FOR PRODUCING ARTICLE CONTAINING FLAKE-LIKE MATERIAL

(71) Applicants: The University of Tokyo, Tokyo (JP); RIKEN TECHNOS CORPORATION, Tokyo (JP)

(72) Inventors: Tomoki Machida, Tokyo (JP); Momoko Onodera, Tokyo (JP); Taketo Hashimoto, Tokyo (JP)

(73) Assignees: The University of Tokyo, Tokyo (JP); RIKEN TECHNOS CORPORATION, Tokyo (JP)

( * ) Notice: Subject to any disclaimer, the term of this patent is extended or adjusted under 35 U.S.C. 154(b) by 366 days.

(21) Appl. No.: 18/317,467

(22) Filed: May 15, 2023

(65) Prior Publication Data

US 2023/0415372 A1 Dec. 28, 2023

(30) Foreign Application Priority Data

Jun. 13, 2022 (JP) ................................. 2022-094928

(51) Int. Cl.
*C01B 21/064* (2006.01)
*C01B 32/194* (2017.01)
*C08J 5/18* (2006.01)

(52) U.S. Cl.
CPC ........ *C01B 21/0648* (2013.01); *C01B 32/194* (2017.08); *C08J 5/18* (2013.01);

(Continued)

(58) Field of Classification Search
CPC ............... C01B 21/0648; C01B 32/194; C01P 2002/76; C01P 2004/24; C08J 2327/06; C08J 5/18

See application file for complete search history.

(56) References Cited

U.S. PATENT DOCUMENTS

2023/0415372 A1* 12/2023 Machida ............. C01B 21/0648

FOREIGN PATENT DOCUMENTS

JP 2016-508891 A 3/2016
WO 2014-089437 A1 6/2014

OTHER PUBLICATIONS

Momoko Onodera et al., "Assembly of van der Waals heterostructures: exfoliation, searching, and stacking of 2D materials", 2020 Japanese Journal of Applied Physics 59, 010101(2020).

(Continued)

*Primary Examiner* — Sonya M Sengupta
(74) *Attorney, Agent, or Firm* — Raphael Bellum PLLC

(57) ABSTRACT

A method for manipulating a flake-like material, the method comprising: (2) a step of grounding a first probe of which a tip is covered with a first resin film on the flake-like material left still on a substrate, and pressing the first probe to pick up the flake-like material; (3) a step of grounding a second probe of which a tip is covered with a second resin film on a surface on an opposite side to the first probe of the flake-like material picked up by the first probe in the step (2), and pressing the second probe; and (4) a step of transferring the flake-like material picked up by the first probe to the second probe by separating the first probe and the second probe, wherein (i) a thickness ratio (thickness B/thickness A) of a thickness B of the second resin film to a thickness A of the first resin film when pressing is not performed is less than 1.

12 Claims, 2 Drawing Sheets

(52) U.S. Cl.
CPC ...... *C01P 2002/76* (2013.01); *C01P 2004/24* (2013.01); *C08J 2327/06* (2013.01)

(56) References Cited

OTHER PUBLICATIONS

Yusai Wakafuji et al., "3D Manipulation of 2D Materials Using Microdome Polymer" Nano Letters 2020, 20, pp. 2486-2492.

* cited by examiner

METHOD FOR MANIPULATING FLAKE-LIKE MATERIAL AND METHOD FOR PRODUCING ARTICLE CONTAINING FLAKE-LIKE MATERIAL

CROSS REFERENCE TO RELATED APPLICATIONS

This application claims the benefit of foreign priority to Japanese Patent Application No. JP2022-094928 filed on Jun. 13, 2022 with the Japanese Patent Office, which is incorporated herein by reference in its entirety.

BACKGROUND OF THE INVENTION

1. Field of the Invention

The present invention relates to a method for manipulating a flake-like material, typically a two-dimensional material such as graphene or hexagonal boron nitride, and to a method for producing an article containing a flake-like material using the manipulation method.

2. Description of the Related Art

Flake-like materials, typically two-dimensional materials such as graphene and hexagonal boron nitride, have attracted attention as new materials with tremendous potential. Methods for forming microstructures, typically nanoscaled microstructures using flake-like materials, and articles containing flake-like materials have been proposed.

When articles containing flake-like materials are produced, it is necessary to flip the flake-like materials over in some cases. In order to flip flake-like materials over, it is convenient to exchange the picked up flake-like material between the probes.

In order to exchange a flake-like material between the probes,
(1) the probe on the transferring side is required to hold the flake-like material securely until the probe on the receiving side is grounded on the surface on the opposite side to the probe on the transferring side of the picked up flake-like material, and pressed (the probe on the transferring side is required not to unintentionally release the flake-like material until transfer is performed after pickup has been performed), and
(2) when the two probes are separated and the flake-like material is transferred, the probe on the transferring side is required to release the flake-like material securely and the probe on the receiving side is required to hold the flake-like material securely (the probe on the transferring side is required not to unintentionally hold the flake-like material continuously at the time of transfer, and the probe on the receiving side is required not to unintentionally release the flake-like material after the transfer has been performed).

However, it is difficult to satisfy the requirements (1) and (2).

Examples of prior art documents for showing the state of the art include JP-A-2016-508891 (a patent literature); Momoko Onodera et al., 2020 Japanese Journal of Applied Physics 59, 010101(2020); and Yusai Wakafuji et al., Nano Letters 2020, 20, pp. 2486-2492 (non-patent literatures).

SUMMARY OF INVENTION

An object of the present invention is to provide a new method for manipulating a flake-like material.

As a result of extensive studies, the inventors of the present invention have found out that the object can be achieved by using resin films having different thicknesses as a cover for the tip of a probe on the transferring side and a cover for the tip of a probe on the receiving side.

In other words, the present invention includes aspects and embodiments as summarized in the following items.

[1].
A method for manipulating a flake-like material, the method comprising:
(1) a step of preparing a first probe of which a tip is covered with a first resin film and a second probe of which a tip is covered with a second resin film;
(2) a step of grounding the first probe of which the tip is covered with the first resin film on the flake-like material left still on a substrate, and pressing the first probe to pick up the flake-like material;
(3) a step of grounding the second probe of which the tip is covered with the second resin film on a surface on an opposite side to the first probe of the flake-like material picked up by the first probe in the step (2), and pressing the second probe; and
(4) a step of transferring the flake-like material picked up by the first probe to the second probe by separating the first probe and the second probe,
wherein (i) a thickness ratio (thickness B/thickness A) of a thickness B of the second resin film to a thickness A of the first resin film when pressing is not performed is less than 1.

[2].
The manipulation method according to [1], in which the thickness ratio (thickness B/thickness A) is 0.8 or less.
[3].
The manipulation method according to [1] or [2], in which the flake-like material is a two-dimensional material.
[4].
The manipulation method according to any one of [1] to [3], in which the first resin film and the second resin film are each a polyvinyl chloride resin film.
[5].
The manipulation method according to any one of [1] to [4], in which
the tip of the first probe and the tip of the second probe are each made from a silicone resin, and
the flake-like material is graphene or hexagonal boron nitride.
[6].
The manipulation method according to any one of [1] to [5], in which
the first resin film is formed from a polyvinyl chloride resin containing (A-a) 100 parts by mass of a polyvinyl chloride resin and (A-b) α parts by mass of a plasticizer, and
the second resin film is formed from a polyvinyl chloride resin containing (B-a) 100 parts by mass of a polyvinyl chloride resin and (B-b) β parts by mass of a plasticizer, where the α and the β meet the condition: α>β.
[7].
A method for producing an article containing a flake-like material,
the method comprising manipulating the flake-like material using the manipulation method according to any one of [1] to [6].

The method for manipulating a flake-like material of the present invention can satisfy two requirements to successfully exchange a flake-like material between the probes:

(1) the probe on the transferring side is required to hold the flake-like material securely until the probe on the receiving side is grounded on the surface on the opposite side to the probe on the transferring side of the picked up flake-like material, and pressed (the probe on the transferring side is required not to unintentionally release the flake-like material until transfer is performed after pickup has been performed), and (2) when the two probes are separated and the flake-like material is transferred, the probe on the transferring side is required to release the flake-like material securely and the probe on the receiving side is required to hold the flake-like material securely (the probe on the transferring side is required not to unintentionally hold the flake-like material continuously at the time of transfer, and the probe on the receiving side is required not to unintentionally release the flake-like material after the transfer has been performed).

In other words, by using the method for manipulating a flake-like material of the present invention, it is possible to exchange a flake-like material between the probes securely.

Hence, the method for manipulating a flake-like material of the present invention is highly useful for industrially producing an article containing a flake-like material, typically a two-dimensional material such as graphene or hexagonal boron nitride with high productivity.

DESCRIPTION OF THE EMBODIMENTS

Figure 1:
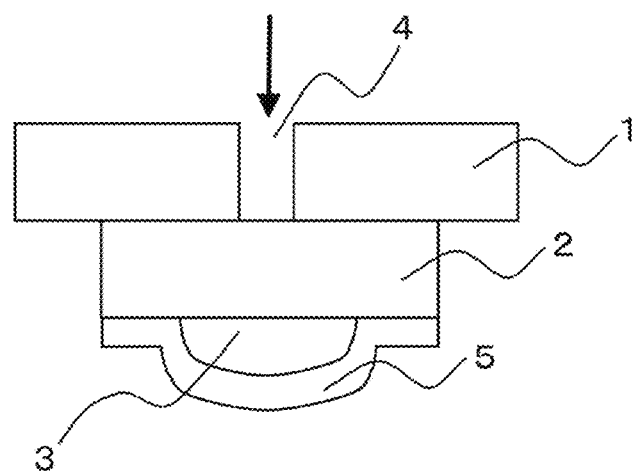
FIG. 1 is a conceptual diagram illustrating a probe of which the tip is covered with a resin film in a preferred embodiment of the method for manipulating a flake-like material of the present invention.

In the present specification, the term "resin" is used as a term including resin mixtures containing two or more kinds of resins and resin compositions containing components other than resins as well.

In the present specification, the term "film" is used interchangeably or intersubstitutably with "sheet".

In the present specification, the terms "film" and "sheet" are used for those that can be industrially wound in a roll shape. The term "plate" is used for those that cannot be industrially wound in a roll shape. A "film" and a "sheet" have uniform thicknesses throughout unless otherwise specified.

In addition, in the present specification, sequentially laminating one layer on another layer includes both laminating those layers directly and laminating those layers with one or more other layers such as an anchor coat interposed therebetween.

In the present specification, the term "or more" relating to a numerical range is used in the meaning of a certain numerical value or more than a certain numerical value. For example, 20% or more means 20% or more than 20%.

In the present specification, the term "or less" relating to a numerical range is used in the meaning of a certain numerical value or less than a certain numerical value. For example, 20% or less means 20% or less than 20%.

In addition, the symbol "–" (or "to") relating to a numerical range is used in the meaning of a certain numerical value, more than a certain numerical value and less than another certain numerical value, or the latter certain numerical value. Here, the latter certain numerical value is a numerical value greater than the former certain numerical value. For example, 10% to 90% means 10%, more than 10% and less than 90%, or 90%.

Furthermore, the upper limit and lower limit of a numerical range can be arbitrarily combined, and embodiments in which the upper limit and lower limit are arbitrarily combined are read. For example, from the statement "usually 10% or more, preferably 20% or more but usually 40% or less, preferably 30% or less" or "usually 10% to 40%, preferably 20% to 30%" relating to a numerical range of a certain property, the numerical range of the certain property is read to be 10% to 40%, 20% to 30%, 10% to 30%, or 20% to 40% in an embodiment.

All numerical values used in the present specification and claims should be understood as being modified by the term "about" in the description other than Examples or unless otherwise specified.

Without intending to limit the application of the doctrine of equivalents with respect to the claims, the respective numerical values should be interpreted in view of significant digits and by applying conventional rounding techniques.

In the present specification, terms specifying shapes and geometrical conditions, for example, parallel, orthogonal, and perpendicular also include substantially the same states in addition to the strict meaning.

In the present specification, the term "two-dimensional material" is used as a term including a stack in which strictly meant two-dimensional materials are stacked by from two to several tens of layers in addition to its strict meaning (a material having a thickness corresponding to one atom to several atoms).

The method for manipulating a flake-like material of the present invention includes:

(1) a step of preparing a first probe of which a tip is covered with a first resin film and a second probe of which a tip is covered with a second resin film;

(2) a step of grounding the first probe of which the tip is covered with the first resin film on the flake-like material left still on a substrate, and pressing the first probe to pick up the flake-like material;

(3) a step of grounding the second probe of which the tip is covered with the second resin film on a surface on an opposite side to the first probe of the flake-like material picked up by the first probe in the step (2), and pressing the second probe; and (4) a step of transferring the flake-like material picked up by the first probe to the second probe by separating the first probe and the second probe, where (i) a thickness ratio (thickness B/thickness A) of a thickness B of the second resin film to a thickness A of the first resin film when pressing is not performed is less than 1.

Hereinafter, the respective steps will be described.

Step (1)

Step (1) is a step of preparing a first probe of which a tip is covered with a first resin film and a second probe of which a tip is covered with a second resin film.

In step (1), the resin films used as the first resin film and the second resin film are cut into appropriate sizes, then placed so as to cover the tips of probes used as the first probe and the second probe, and bonded. The cut sizes of the resin films are not particularly limited as long as the tips of the probes, namely, the part with which the flake-like material may come into contact during pickup and transfer are completely covered.

The method for performing the bonding can be appropriately selected from the viewpoint of preventing the resin film from peeling/falling off from the probe during manipulation.

The method for performing the bonding is not particularly limited, but examples thereof include the following methods:
- a method in which the resin film is allowed to self-adhere to the tip of the probe;
- a method in which a pressure sensitive adhesive/adhesive is interposed between the resin film and the tip of the probe;
- a method in which the resin film is brought into close contact with the tip of the probe and then the end of the resin film is fixed to the base of the probe or the like by using a jig or an adhesive tape; and
- a combination of these methods.

When the bonding is performed, the resin film and/or the probe may be preheated to an appropriate temperature as desired. The preheating temperature may vary depending on the material used, and is not particularly limited, but may be, for example, 40° C. to 200° C.

Before the bonding is performed, the surface of the resin film and/or the surface of the tip of the probe may be washed with an appropriate solvent such as isopropanol, ethanol, or acetone.

Probes used as the first probe and the second probe will be described.

FIG. 1 is a conceptual diagram illustrating a preferred embodiment of a probe of which the tip is covered with a resin film.

The probe according to a preferred embodiment includes a metal base 1, a glass intermediate member 2 disposed on the base 1, and a dome-shaped polydimethylsiloxane tip 3 further disposed on the intermediate member 2.

The base 1 has a perforation 4 in the center, and in the direction of the arrow illustrated, a flake-like material to be manipulated can be observed through the perforation 4 across the probe.

A resin film 5 is in a state of self-adhering to the tip 3 of the probe, and further the end of the resin film 5 is in a state of being fixed to the intermediate member 2 of the probe using an adhesive tape (not illustrated).

The shape and material of the resin film and probe illustrated in FIG. 1 should be understood as one preferred example, and the present invention is not limited thereto. This applies equally to the subsequent drawings.

For example, the shape and material of the base 1 are not particularly limited as long as the base can stably hold the intermediate member 2 and freely manipulate the intermediate member 2, and the base 1 may be a hard resin base instead of the metal base. The shape and material of the intermediate member 2 are not particularly limited as long as the intermediate member 2 has an area equal to or larger than the flat portion of the tip 3 and stably hold the tip 3, and the intermediate member 2 may be a transparent resin intermediate member instead of the glass intermediate member.

The shape of the tip of the probe can be appropriately selected from the viewpoint of preventing a gap from being formed between the tip of the probe and the resin film when the tip is covered with the resin film. The tip of the probe preferably has a curved surface at least in the vicinity of its top. It is preferable that at least part of the tip of the probe, preferably the entire circumference of the outer edge of the bottom, forms a flat surface so that the close contact property with the intermediate member that supports the tip can be maintained at the bottom on the opposite side to the top of the tip. Alternatively, the entire bottom on the opposite side to the top of the tip of the probe may form a flat surface.

The shape of the tip of the probe is preferably a dome shape from the viewpoint of preventing a gap from being formed between the tip of the probe and the resin film when the tip is covered with the resin film. The "dome shape" as referred to herein means a shape having an outer surface that is composed substantially entirely of a curved surface and preferably does not include any sharp corner of 90 degrees or less. For example, the dome shape may be a shape forming at least part of a substantially hemispherical body or a substantially semi-ellipsoidal body. The radius of curvature of the dome-shaped tip is not particularly limited, but may be, for example, usually 100 µm or more and 10 cm or less, or 200 µm or more and 5 cm or less, or 300 µm or more and 1 cm or less, or 400 µm or more and 0.5 cm or less.

The material of the tip of the probe can be appropriately selected from the viewpoint of the temperature in each step of the present invention, the pressing force in step (3), and the transparency.

The material of the tip of the probe may be preferably silicone-based resins such as polydimethylsiloxane, polydiethylsiloxane, polymethylphenylsiloxane, polydiphenylsiloxane, and modified products thereof.

As the first probe and the second probe, substantially the same probe (formed of substantially the same material and having substantially the same shape) may be used, or probes, which are formed of different materials and have different shapes, may be used.

As the first probe and the second probe, it is preferable to use substantially the same probe (formed of substantially the same material and having substantially the same shape) from the viewpoint of decreasing the number of controlling factors when a flake-like material is transferred from the first probe to the second probe in step (4), increasing the predictability of the manipulation results, and securely transferring the flake-like material from the first probe to the second probe. The first probe and the second probe may be formed of completely the same material and have completely the same shape. The first probe and the second probe may have a dome shape with these probes being formed of completely the same material and having completely the same shape.

Hereinafter, resin films used as the first resin film and second resin film will be described.

The resin films can be appropriately selected in consideration of the kind of flake-like material and from the viewpoint of enabling each step of the present invention to be performed without troubles.

Examples of the resin films include resin films of polyvinyl chloride-based resins; acrylic resins such as polymethyl methacrylate, polyethyl methacrylate, methyl methacrylate/ethyl acrylate copolymer, and vinylcyclohexane/methyl (meth)acrylate copolymer; polyolefin-based resins such as polyethylene, polypropylene, and poly-4-methylpentene-1; polycarbonate-based resins such as 2,2-bis(4-hydroxyphenyl)propane carbonate and polypropylene carbonate; polyester-based resins such as polyethylene terephthalate; cyclic hydrocarbon-based resins such as ethylene/norbornene copolymer, cellulose ester-based resins such as triacetyl cellulose; poly(meth)acrylimide-based resins; polyamide-based resins; polyarylate-based resins; polymer-type urethane acrylate-based resins; polyimide-based resins; and the like.

These films include unstretched films, uniaxially stretched films, and biaxially stretched films. In addition, these films include multilayer films in which one or two or more kinds of the above resins are stacked by two or more layers.

As the resin films, among these, polyvinyl chloride-based resins; polycarbonate-based resins such as 2,2-bis(4-hydroxyphenyl)propane carbonate and polypropylene carbonate; and acrylic resins such as polymethyl methacrylate, polyethyl methacrylate, and methyl methacrylate/ethyl acrylate copolymer are preferred, and polyvinyl chloride-based resins are more preferred in a case where the flake-like material is a two-dimensional material.

The first resin film and the second resin film may be films formed of the same resin, or may be films formed of different resins.

The first resin film may preferably be a polyvinyl chloride-based resin film.

The second resin film may preferably be a polyvinyl chloride-based resin film.

The first resin film and the second resin film may both preferably be polyvinyl chloride-based resin films.

The thickness of the resin films can be appropriately selected from the viewpoints of productivity in forming the film and handleability in manipulating the flake-like material.

The thickness of the resin films may be usually 0.5 to 300 μm, preferably 1 to 200 μm, more preferably 5 to 150 μm from the viewpoints of productivity in forming the film and handleability in manipulating the flake-like material.

Examples of the polyvinyl chloride-based resin forming the polyvinyl chloride-based resin film include polyvinyl chloride (vinyl chloride homopolymer); vinyl chloride-based copolymers of vinyl chloride and other monomers copolymerizable with vinyl chloride such as vinyl chloride/vinyl acetate copolymer, vinyl chloride/(meth)acrylic acid copolymer, vinyl chloride/methyl (meth)acrylate copolymer, vinyl chloride/ethyl (meth)acrylate copolymer, vinyl chloride/maleate copolymer, vinyl chloride/ethylene copolymer, vinyl chloride/propylene copolymer, vinyl chloride/styrene copolymer, vinyl chloride/isobutylene copolymer, vinyl chloride/vinylidene chloride copolymer, vinyl chloride/styrene/maleic anhydride terpolymer, vinyl chloride/styrene/acrylonitrile terpolymer, vinyl chloride/butadiene copolymer, vinyl chloride/isoprene copolymer, vinyl chloride/chlorinated propylene copolymer, vinyl chloride/vinylidene chloride/vinyl acetate terpolymer, vinyl chloride/acrylonitrile copolymer, and copolymers of vinyl chloride/various vinyl ethers; and chlorinated products thereof such as post-chlorinated polyvinyl chloride.

In an alternative embodiment, chlorinated polyolefins, such as chlorinated polyethylene, similar in chemical structure to polyvinyl chloride may be used.

Among these, polyvinyl chloride (vinyl chloride homopolymer) is preferred.

As the polyvinyl chloride-based resin, one kind of these or a mixture of two or more kinds of these can be used.

The polyvinyl chloride-based resin may further contain other resins commonly used in polyvinyl chloride-based resin compositions.

The proportion of the other resins blended is not particularly limited as long as it does not impair the object of the present invention. The proportion of the other resins blended may be usually 0% to 40% by mass, preferably 0% to 20% by mass.

Examples of the other resins include ethylene/vinyl acetate copolymer; ethylene/(meth)acrylic acid copolymer; ethylene/(meth)acrylic acid alkyl ester copolymers such as ethylene/methyl (meth)acrylate copolymer; acrylic resins such as polymethyl methacrylate; and core-shell rubbers such as methacrylate/styrene/butadiene rubber graft copolymers and methacrylate/acrylate rubber graft copolymers.

As the other resins, one kind of these or a mixture of two or more kinds of these can be used.

The polyvinyl chloride-based resin preferably further contains a plasticizer commonly used in polyvinyl chloride-based resin compositions from the viewpoint of enabling each step of the present invention to be performed in a relatively low temperature range and from the viewpoint of processability in forming the film.

Examples of the plasticizer include phthalate-based plasticizers, trimellitate-based plasticizers, pyromellitate-based plasticizers, adipate-based plasticizers, itaconate-based plasticizers, citrate-based plasticizers, cyclohexanedicarboxylate-based plasticizers, and epoxy-based plasticizers.

Other examples of the plasticizer include polyester-based plasticizers obtained using, as polyhydric alcohols, ethylene glycol, diethylene glycol, triethylene glycol, 1,2-propylene glycol, 1,3-propylene glycol, 1,3-butanediol, 1,4-butanediol, 1,5-hexanediol, 1,6-hexanediol, neopentyl glycol and the like; using as polycarboxylic acids, oxalic acid, malonic acid, succinic acid, glutaric acid, adipic acid, trimellitic acid, pimelic acid, suberic acid, maleic acid, azelaic acid, sebacic acid, fumaric acid, phthalic acid, isophthalic acid, terephthalic acid and the like; and, using, as stoppers, monohydric alcohols or monocarboxylic acids, if necessary.

Examples of the phthalate-based plasticizers include dibutyl phthalate, butylhexyl phthalate, diheptyl phthalate, di(2-ethylhexyl) phthalate, diisononyl phthalate, diisodecyl phthalate, diundecyl phthalate, ditridecyl phthalate, dilauryl phthalate, dicyclohexyl phthalate, and dioctyl terephthalate.

Examples of the trimellitate-based plasticizers include tri(2-ethylhexyl) trimellitate, tri(n-octyl) trimellitate, and tri(isononyl) trimellitate.

Examples of the adipate-based plasticizers include bis(2-ethylhexyl) adipate, dioctyl adipate, diisononyl adipate, and diisodecyl adipate.

Examples of the epoxy-based plasticizers include epoxidized soybean oil, epoxidized linseed oil, epoxidized fatty acid octyl ester, and epoxidized fatty acid alkyl ester.

Other examples of the plasticizer include trimellitic acid-based plasticizers, cyclohexanedicarboxylate-based plasticizers, tetrahydrophthalate diester-based plasticizers, glycerol ester-based plasticizers, epoxy hexahydrophthalate diester-based plasticizers, isosorbide diester-based plasticizers, phosphate-based plasticizers, azelaic acid-based plasticizers, sebacic acid-based plasticizers, stearic acid-based plasticizers, citric acid-based plasticizers, pyromellitic acid-based plasticizers, biphenyltetracarboxylate-based plasticizers, and chlorine-based plasticizers.

As the plasticizer, one kind of these or a mixture of two or more kinds of these can be used.

The amount of the plasticizer blended, if used, may be preferably 10 parts by mass or more, more preferably 20 parts by mass or more, still more preferably 30 parts by mass or more based on 100 parts by mass of the sum of the polyvinyl chloride-based resin and the other resins from the viewpoint of reliably exhibiting the effect by the plasticizer used.

Meanwhile, the amount of the plasticizer blended may be usually 120 parts by mass or less, preferably 80 parts by mass or less, more preferably 60 parts by mass or less based on 100 parts by mass of the sum of the polyvinyl chloride-based resin and the other resins from the viewpoint of suppressing troubles such as bleeding out of the plasticizer.

The polyvinyl chloride-based resin may further contain chlorine scavengers such as hydrotalcite compounds, zeolite compounds, and metal soaps; and/or antioxidants such as phosphorus-based, phenol-based, and sulfur-based antioxidants from the viewpoint of processing stability in forming the film.

The amount of the chlorine scavenger and/or antioxidant blended (the total amount of these blended), if used, may be preferably 0.1 to 10 parts by mass, more preferably 0.5 to 3 parts by mass based on 100 parts by mass of the sum of the polyvinyl chloride-based resin and the other resins.

The polyvinyl chloride-based resin may not or may further contain a material commonly used in polyvinyl chloride-based resin compositions as long as it does not impair the object of the present invention.

Examples of optional components that may be contained in the polyvinyl chloride-based resin include light stabilizers such as hindered amine-based light stabilizers, ultraviolet absorbers such as benzotriazole-based ultraviolet absorbers and benzophenone-based ultraviolet absorbers, β-diketone compounds, perchlorates, polyhydric alcohols, pigments, lubricants, cross-linking agents, antistatic agents, antifogging agents, plate out preventing agents, surface treatment agents, flame retardants, fillers, fluorescent agents, antifungal agents, bactericides, metal deactivators, release agents, and processing aids.

The amount of these optional components blended may be usually 20 parts by mass or less or 0 to 10 parts by mass based on 100 parts by mass of the sum of the polyvinyl chloride-based resin and the other resins.

The method for forming a polyvinyl chloride-based resin film using the polyvinyl chloride-based resin can be appropriately selected in consideration of the desired thickness and the properties of the polyvinyl chloride-based resin.

Examples of the film forming method include a film forming method by T-die extrusion, a film forming method by calendar roll rolling, and a film forming method by solvent casting.

The thickness of the polyvinyl chloride-based resin film can be appropriately selected from the viewpoints of productivity in forming the film and handleability in manipulating the flake-like material.

The thickness of the polyvinyl chloride-based resin film may be usually 0.5 to 300 μm, preferably 1 to 200 μm, more preferably 5 to 150 μm from the viewpoints of productivity in forming the film and handleability in manipulating the flake-like material.

Step (2)

Step (2) is a step of picking up a flake-like material using a first probe of which the tip is covered with a first resin film.

In step (2), the first probe of which the tip is covered with the first resin film is grounded on the flake-like material left still on a substrate, and pressed to pick up the flake-like material.

The first resin film is required to cover the tip of the first probe at least to such an extent that it covers the part with which the flake-like material comes into contact when the first probe is grounded and pressed to pick up the flake-like material. The first resin film may usually cover the tip of the first probe so as to be in contact with at least 30% of the surface area of the projection, including the vicinity of the top of the tip, and preferably covers the tip so as to be in contact with at least 50% of the surface area of the projection.

In Step (2), the flake-like material is preferably controlled (heated or cooled) to an appropriate temperature before being picked up.

The control of the temperature of the flake-like material can be performed, for example, by heating or cooling the substrate or the base on which the substrate is installed. The temperature of the flake-like material to be controlled can be appropriately determined in consideration of the material type of the flake-like material and the thickness and material of the first resin film and from the viewpoint of securely picking up the flake-like material.

The temperature of the flake-like material to be controlled is usually determined by performing a preliminary experiment. Reference Examples in the experimental part described later are typical examples of preliminary experiments.

In Step (2), the first resin film and the first probe may be controlled (heated or cooled) to an appropriate temperature before being grounded on the flake-like material, and pressed.

The temperature control of the first resin film and first probe can be performed, for example, by heating or cooling the base of the first probe ("1" in FIG. 1).

The controlled temperature of the flake-like material and/or the first resin film and first probe in Step (2) is not particularly limited, but may be usually 40° C. to 150° C., preferably 45° C. to 110° C., more preferably 50° C. to 100° C.

In Step (2), the force when the first probe of which the tip is covered with the first resin film is grounded on the flake-like material left still on a substrate, and pressed can be appropriately determined in consideration of the material type and thickness of the first resin film, the kind of flake-like material, and the mechanical strength of the first probe.

In Step (2), the force when the first probe of which the tip is covered with the first resin film is grounded on the flake-like material left still on a substrate, and pressed may be usually 0.0005 to 5 N, preferably 0.001 to 1 N, more preferably 0.01 to 0.1 N.

The flake-like material is not particularly limited but is only required to have a flake-like shape.

Examples of the flake-like material include a two-dimensional material and a material that is an aggregate of two-dimensional material and has a flake-like shape.

The flake-like material, in a typical embodiment, may be a two-dimensional material.

Examples of the two-dimensional material include, but are not limited to, the following:

monoatomic layer materials (materials having a thickness corresponding to one atom) such as graphene, graphene oxide, and hexagonal boron nitride;

monomolecular layer materials (materials having a thickness corresponding to two to several atoms) such as molybdenum disulfide ($MoS_2$) and niobium diselenide ($NbSe_2$);

transition metal chalcogenides and transition metal dichalcogenides containing a transition metal and one or more chalcogen elements (for example, sulfur, selenium, and tellurium);

Perovskite-type compounds formed in two-dimensional layers (for example, calcium titanate ($CaTiO_3$), strontium titanate ($SrTiO_3$), and barium titanate ($BaTiO_3$)); and a stack in which one kind or two or more kinds of these are stacked by two to several tens of layers, for example, graphite in which multilayers of graphene are stacked.

The size of the flake-like material in plan view is not particularly limited but is only required to be capable of being picked up by the first probe, and may be, for example, 1 μm to 3 cm at the longest portion, or 2 μm to 1 cm at the longest portion, 5 μm to 5 mm at the longest portion, or 10 μm to 3 mm at the longest portion.

The substrate is not particularly limited, but examples thereof include a silicon substrate (Si substrate), a substrate in which a silicon dioxide film is formed on the surface of a silicon substrate (Sift/Si substrate), a silicon carbide substrate (SiC substrate), and substrates formed of inorganic glass such as soda lime glass, borosilicate glass and quartz glass.

As an additional preferred embodiment of this step, a stack of flake-like material (typically two-dimensional material) can also be picked up.

This additional embodiment may include (i) grounding a first probe of which the tip is covered with a first resin film on a first flake-like material left still on a substrate and pressing the first probe to pick up the first flake-like material, (ii) picking up a second flake-like material (left still on a substrate) from the substrate by grounding/pressing the second flake-like material on/against the surface on the opposite side to the first probe of the first flake-like material, thereby picking up a two-layer stack of flake-like materials; and (iii) optionally picking up a stack of three or more layers of flake-like materials by further repeating the manipulation of (ii) one time or multiple times. Those described above may be similarly employed in the temperature control, pressing force control, and the like in this additional embodiment.

By such an embodiment, it is possible not only to pick up a single layer of flake-like material (typically a two-dimensional material) but also to pick up a flake-like material in the form of a stack of multiple layers, and it is also possible to successfully obtain a stack of flake-like materials flipped over by transferring this stack to a second probe and then disposing this stack on another substrate.

Here, the second flake-like material may have an area equal to or less than the area of the first flake-like material in plan view (for example, having an area to be less than about 100%, or about 95% or less, or about 90% or less, or about 85% or less, or about 80% or less of the area of the first flake-like material in plan view). Conversely, the first flake-like material may have an area equal to or less than the area of the second flake-like material in plan view (for example, having an area to be less than about 100%, or about 95% or less, or about 90% or less, or about 85% or less, or about 80% or less of the area of the second flake-like material in plan view). Alternatively, the first flake-like material and the second flake-like material may have the same area in plan view. The magnitude relation in area between the first and second flake-like materials in plan view may be similarly applied to the magnitude relation in area between the respective flake-like materials in adjacent layers in plan view in the case of obtaining a stack of three or more layers of flake-like materials.

Step (3)

Step (3) is a step of grounding the second probe of which the tip is covered with the second resin film on the surface on the opposite side to the first probe of the flake-like material picked up by the first probe in step (2), and pressing the second probe.

The second resin film is required to cover the tip of the second probe at least to such an extent that it covers the part with which the flake-like material comes into contact when the second probe is grounded on the surface on the opposite side of the flake-like material and pressed. The second resin film may usually cover the tip of the second probe so as to be in contact with at least 30% of the surface area of the projection, including the vicinity of the top of the tip, and preferably covers the tip so as to be in contact with at least 50% of the surface area of the projection.

In step (3), when the first resin film is grounded on one surface of the flake-like material and the second resin film is grounded on the other surface, it is preferable to control the temperatures of the flake-like material, first resin film, and second resin film to appropriate temperatures, respectively.

The controlled temperature of the flake-like material, first resin film and second resin film in step (3) can be appropriately determined in consideration of the material type and thickness of the first resin film, the material type and thickness of the second resin film, and the kind of flake-like material. The controlled temperature in step (3) is not particularly limited, but may be usually 50° C. to 200° C., preferably 70° C. to 120° C., more preferably 80° C. to 110° C.

The controlled temperature in step (3) may be preferably 70° C. to 120° C., more preferably 80° C. to 110° C. in a case where polyvinyl chloride-based resin films formed of substantially the same material are used as the first resin film and the second resin film, the polyvinyl chloride-based resin films have a thickness of 5 to 150 μm, and the flake-like material is a two-dimensional material.

In step (3), the force when the second probe of which the tip is covered with the second resin film is grounded on the surface on the opposite side to the first probe of the flake-like material picked up by the first probe in step (2), and pressed can be appropriately determined in consideration of the material type and thickness of the first resin film, the material type and thickness of the second resin film, the kind of flake-like material, and the mechanical strengths of the first probe and second probe.

In step (3), the force when the second probe of which the tip is covered with the second resin film is grounded on the surface on the opposite side to the first probe of the flake-like material picked up by the first probe in step (2), and pressed may be usually 0.0005 to 5 N, preferably 0.001 to 1 N, more preferably 0.01 to 0.1 N.

Step (4)

Step (4) is a step of transferring the flake-like material picked up by the first probe to the second probe by separating the first probe and the second probe.

From the viewpoint of stably transferring the flake-like material from the first probe to the second probe in step (4), (i) the thickness ratio (thickness B/thickness A) of the thickness B of the second resin film to the thickness A of the first resin film when pressing is not performed is usually less than 1, preferably 0.8 or less, more preferably 0.7 or less, still more preferably 0.6 or less.

Here, the thickness of each resin film is the thickness measured at ordinary temperature and ordinary pressure (typically, at a temperature 25° C. and at a pressure of 1 atm) and in a non-pressed state.

According to the studies by the inventors of the present invention, even if the material of the first resin film and the material of the second resin film are greatly different, if the thicknesses of these resin films are the same, it has been found that it is not easy to satisfy the requirement (2) (when the two probes are separated and the flake-like material is transferred, the probe on the transferring side is required to release the flake-like material securely and the probe on the receiving side is required to hold the flake-like material securely, that is, the probe on the transferring side is required not to unintentionally hold the flake-like material continuously at the time of transfer, and the probe on the receiving side is required not to unintentionally release the flake-like material after the transfer has been performed).

However, it is surprising that the requirement (2) can be easily satisfied, and the picked up flake-like material can be securely exchanged between the probes by setting (i) the thickness ratio (thickness B/thickness A) of the thickness B of the second resin film to the thickness A of the first resin film to usually less than 1, preferably 0.8 or less, more preferably 0.7 or less, still more preferably 0.6 or less.

As a result of extensive studies, the inventors of the present invention have found out that the phase transition temperature of a resin film (typically, a polyvinyl chloride-based resin film) from rubber state to molten state (measured by a compression probe for thermal mechanical analysis (TMA)) greatly shifts to a lower temperature side as the thickness of the resin film increases, even if the material is the same. Although it is not intended to be bound by theory, when (i) the thickness ratio (thickness B/thickness A) of the thickness B of the second resin film to the thickness A of the first resin film is set to usually less than 1 (that is, when the thickness A of the first resin film is greater than the thickness B of the second resin film), the phase transition temperature of the first resin film is shifted to a lower temperature side than the phase transition temperature of the second resin film in an aspect in which both of these resin films are formed of the same material. As a result, the phase state of the first resin film and the phase state of the second resin film are at least partially different at a predetermined temperature, and it is believed that such a state may contribute to the stable transfer of the flake-like material from the first probe to the second probe.

In this way, the suitable temperature for picking up/releasing a flake-like material by a resin film is strongly related to the phase state of the resin film. Hence, it is considered that a picked up flake-like material can be securely exchanged between the probes by properly controlling the thickness of each resin film and the temperatures of each resin film and the flake-like material coming into contact with the resin film by the manipulation method of the present invention.

From the viewpoint of securely transferring the flake-like material from the first probe to the second probe in step (4), it is one of preferred embodiments to set the temperature suitable for the resin film formed using the material of the second resin film to pick up/release the flake-like material to be higher than the temperature suitable for the resin film formed using the material of the first resin film to pick up/release the flake-like material when these resin films having the same thickness are formed and compared.

In the case of using a polyvinyl chloride-based resin film for both the first resin film and the second resin film, from the viewpoint of securely transferring the flake-like material from the first probe to the second probe in Step (4), the relation between the amount of a plasticizer blended α (parts by mass) in the polyvinyl chloride-based resin film used as the first resin film and the amount of a plasticizer blended β (parts by mass) in the polyvinyl chloride-based resin film used as the second resin film may be usually α≥β, preferably α>β, more preferably α≥(β+20), still more preferably α≥(β+50).

Here, the amount of the polyvinyl chloride-based resin blended in the polyvinyl chloride-based resin film (the total amount of the polyvinyl chloride-based resin and the other resin(s) blended in the embodiment containing the other resin(s)) is assumed to be 100 parts by mass.

The article produced using the method for producing an article of the present invention is an article containing a flake-like material. Examples of such an article include transparent electrodes, touch panels, light-emitting electrochemical cells, transistors, integrated circuits, semiconductors, nonvolatile memories, solar cells, power storage devices, gas sensors, infrared sensors, ultraviolet light emitting devices, thermal conducting devices, insulating devices, and superconducting devices.

EXAMPLES

Hereinafter, the present invention will be described with reference to Examples, but the present invention is not limited thereto.

Production Examples of Polyvinyl Chloride-Based Resin Films (α1) A polyvinyl chloride resin composition containing 100 parts by mass of a polyvinyl chloride homopolymer having a degree of polymerization of 1000 and 40 parts by mass of di(2-ethylhexyl) phthalate was dissolved in a solvent (cyclohexane) to obtain a polyvinyl chloride resin composition solution, and then the polyvinyl chloride resin composition solution was applied onto the surface of an inorganic glass plate using an applicator, and dried to obtain a polyvinyl chloride-based resin film (α1) having a thickness of 5 μm. At this time, the concentration of the polyvinyl chloride resin composition solution and the applicator were appropriately changed/adjusted so that the thickness of the polyvinyl chloride-based resin film obtained was 5 μm.

(α2) A polyvinyl chloride-based resin film (α2) was obtained in the same manner as in (α1) except that the thickness of the polyvinyl chloride-based resin film obtained was 15 μm.

(α3) A polyvinyl chloride-based resin film (α3) was obtained in the same manner as in (α1) except that the thickness of the polyvinyl chloride-based resin film obtained was 50 μm.

(α4) A polyvinyl chloride-based resin film (α4) was obtained in the same manner as in (α1) except that the thickness of the polyvinyl chloride-based resin film obtained was 100 μm.

(α5) A polyvinyl chloride-based resin film (α5) was obtained in the same manner as in (α1) except that the thickness of the polyvinyl chloride-based resin film obtained was 150 μm.

(β1) A polyvinyl chloride resin composition containing 100 parts by mass of a polyvinyl chloride homopolymer having a degree of polymerization of 1000 and 120 parts by mass of di(2-ethylhexyl) phthalate at 120 parts by mass was dissolved in a solvent (cyclohexane) to obtain a polyvinyl chloride resin composition solution, and then the polyvinyl chloride resin composition solution was applied onto the surface of an inorganic glass plate using an applicator, and dried to obtain a polyvinyl chloride-based resin film ((31) having a thickness of 1 μm. At this time, the concentration of the polyvinyl chloride resin composition solution and the applicator were appropriately changed/adjusted so that the thickness of the polyvinyl chloride-based resin film obtained was 1 μm.

(β2) A polyvinyl chloride-based resin film (β2) was obtained in the same manner as in (β1) except that the amount of di(2-ethylhexyl) phthalate blended was changed to 80 parts by mass.

(β3) A polyvinyl chloride-based resin film (β3) was obtained in the same manner as in (β1) except that the amount of di(2-ethylhexyl) phthalate blended was changed to 40 parts by mass.

(β4) A polyvinyl chloride-based resin film (β4) was obtained in the same manner as in (β1) except that di(2-ethylhexyl) phthalate was not blended.

Example 1-1

Two identical probes were prepared and used. The probe is in the form of which the conceptual diagram is illustrated in FIG. 1. The probe has a glass intermediate member on a metal base, and further a dome-shaped (hemispherical shape with a diameter of 1.5 mm) polydimethylsiloxane tip on the intermediate member. The base has a perforation in the center, and a flake-like material to be manipulated over the probe can be observed through the perforation.

As the first resin film, the polyvinyl chloride-based resin film (α4) with a thickness of 100 μm obtained in the production example described above was used.

As the second resin film, the polyvinyl chloride-based resin film (α2) with a thickness of 15 μm obtained in the production example described above was used.

In the following description, FIG. 2, A-C will be referred to for easy understanding.

(1) A first resin film 6 cut in an appropriate size (4 mm×4 mm) was overlaid so as to cover a tip 7 of a first probe (one of two probes prepared), i.e., so as to cover the majority of the surface area of the projection of the tip, and allowed to self-adhere, and further the end of the first resin film was fixed to the intermediate member of the first probe using an adhesive tape. Similarly, a second resin film 8 is overlaid so as to cover a tip 9 of a second probe (the other of the two probes prepared), i.e., so as to cover the majority of the surface area of the projection of the tip, and allowed to self-adhere, and further the end of the second resin film 8 was fixed to the intermediate member of the second probe using an adhesive tape (not illustrated).

In this way, the first probe of which the tip 7 was covered with the first resin film 6 and the second probe of which the tip 9 was covered with the second resin film 8 were prepared.

Figure 2:
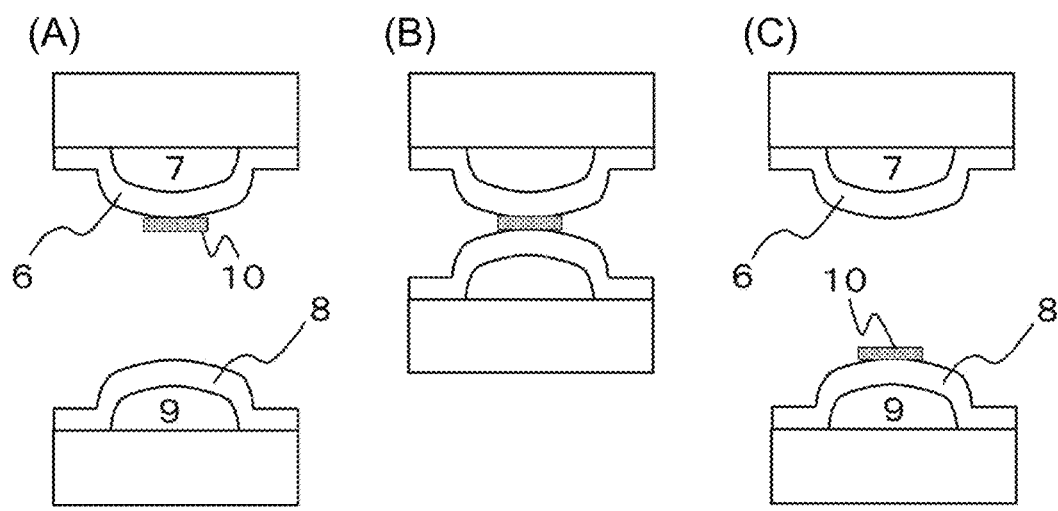
FIG. 2, A-C is a conceptual diagram illustrating the manipulation procedures of steps (2) to (4) in a preferred embodiment of the method for manipulating a flake-like material of the present invention.

(2) Next, a two-dimensional material (hexagonal boron nitride) 10 having a length of about 40 μm at the longest portion left still on a $SiO_2$/Si substrate was heated to a temperature of 55° C., and then pressed and picked up using the first probe of which the tip 7 was covered with the first resin film 6 prepared in step (1) (see the upper side in FIG. 2, A).

(3) Next, the second probe (see the lower side in FIG. 2, A) of which the tip 9 was covered with the second resin film 8 prepared in step (1) was grounded on the surface on the opposite side to the first probe of the two-dimensional material (hexagonal boron nitride) 10 picked up by the first probe in step (2), and pressed (see FIG. 2, B).

At this time, the temperature of the two-dimensional material (hexagonal boron nitride) 10, the first resin film 6, and the second resin film 8 was controlled at 95° C. by performing heating from the second probe side.

(4) Subsequently, the first probe and the second probe were separated. The two-dimensional material (hexagonal boron nitride) 10 picked up by the first probe was transferred to the second probe (see FIGS. 2, C).

(5) (1) to (4) were repeated 20 times.

In all trials, it has been visually confirmed that the two-dimensional material (hexagonal boron nitride) 10 picked up by the first probe was successfully transferred to the second probe (with a transfer probability of 100%).

Examples 1-2 to 1-18

Two-dimensional material transferring tests were each performed by carrying out the respective steps in the same manner as in Example 1-1 except that the controlled temperature in step (3) was set to the temperatures shown in Table 1; the polyvinyl chloride-based resin films with the thicknesses shown in Table 1 obtained in the above-described "Production Examples of polyvinyl chloride-based resin films" were each used as the first resin film; and the polyvinyl chloride-based resin films with the thicknesses shown in Table 1 obtained in the above-described "Production Examples of polyvinyl chloride-based resin films" were each used as the second resin film. The results of transfer probability are shown in Table 1.

TABLE 1

| Evaluation of transfer probability under respective manipulation conditions | | | | | | | | | |
|---|---|---|---|---|---|---|---|---|---|
| | Ex 1-1 | Ex. 1-2 | Ex 1-3 | Ex. 1-4 | Ex. 1-5 | Ex. 1-6 | Ex. 1-7 | Ex. 1-8 | Ex. 1-9 |
| Thickness A of first resin film (μm) | 100 | 100 | 100 | 100 | 100 | 150 | 150 | 150 | 150 |
| Thickness B of second resin film (μm) | 15 | 5 | 50 | 100 | 150 | 5 | 15 | 50 | 100 |
| Thickness ratio B/A | 0.15 | 0.05 | 0.50 | 1.00 | 1.50 | 0.03 | 0.10 | 0.33 | 0.67 |
| Controlled temperature in step (2) (° C.) | 55 | 55 | 55 | 55 | 55 | 55 | 55 | 55 | 55 |
| Controlled temperature in step (3) (° C.) | 95 | 105 | 95 | 95 | 80 | 95 | 95 | 90 | 80 |
| Transfer probability (%) | 100 | 100 | 100 | 40 | 5 | 100 | 100 | 100 | 95 |
| | Ex. 1-10 | Ex. 1-11 | Ex. 1-12 | Ex. 1-13 | Ex. 1-14 | Ex 1-15 | Ex. 1-16 | Ex. 1-17 | Ex. 1-18 |
| Thickness A of first resin film (μm) | 50 | 50 | 50 | 50 | 15 | 15 | 15 | 5 | 5 |
| Thickness B of second resin film (μm) | 5 | 15 | 50 | 100 | 5 | 15 | 50 | 5 | 15 |
| Thickness ratio B/A | 0.10 | 0.30 | 1.00 | 2.00 | 0.33 | 1.00 | 3.33 | 1.00 | 3.00 |
| Controlled temperature in step (2) (° C.) | 55 | 55 | 55 | 55 | 55 | 55 | 55 | 55 | 55 |
| Controlled temperature in step (3) (° C.) | 105 | 105 | 115 | 95 | 110 | 120 | 105 | 135 | 110 |
| Transfer probability (%) | 100 | 100 | 20 | 0 | 100 | 20 | 10 | 40 | 10 |

From the results shown in Table 1, it has been found that higher transfer probabilities are achieved when the thickness ratio (thickness B/thickness A) of the thickness B of the second resin film to the thickness A of the first resin film is adjusted to less than 1 according to the present invention compared to those when such adjustment is not made.

Example 2

A two-dimensional material transferring test was performed by carrying out the respective steps in the same manner as in Example 1-1 except that flake-shaped graphite with a thickness of 50 nm (length of about 40 µm at the longest portion) was used as the flake-like material. The transfer probability was 100%.

Example 3

A two-dimensional material transferring test was performed by carrying out the respective steps in the same manner as in Example 1-1 except that flake-shaped molybdenum disulfide ($MoS_2$) with a thickness of 50 nm (length of about 40 µm at the longest portion) was used as the flake-like material. The transfer probability was 100%.

Example 4

Two identical probes were prepared and used. The probe is in the form of which the conceptual diagram is illustrated in FIG. 1. The probe has a glass intermediate member on a metal base, and further a dome-shaped (hemispherical shape with a diameter of 1.5 mm) polydimethylsiloxane tip on the intermediate member. The base has a perforation in the center, and a flake-like material to be manipulated over the probe can be observed through the perforation.

As the first resin film, the polyvinyl chloride-based resin film (α4) with a thickness of 100 µm obtained in the fabrication of a polyvinyl chloride-based resin film described above was used.

As the second resin film, the polyvinyl chloride-based resin film (α2) with a thickness of 15 µm obtained in the fabrication of a polyvinyl chloride-based resin film described above was used.

In the following description, FIG. 2, A-C will be referred to for easy understanding.

(1) A first resin film 6 cut in an appropriate size (4 mm×4 mm) was covered so as to cover a tip 7 of a first probe (one of two probes prepared) (so as to cover the majority of the surface area of the projection of the tip), and allowed to self-adhere, and further the end of the first resin film was fixed to the intermediate member of the first probe using an adhesive tape. Similarly, a second resin film 8 is covered so as to cover a tip 9 of a second probe (the other of the two probes prepared) (so as to cover the majority of the surface area of the projection of the tip), and allowed to self-adhere, and further the end of the second resin film 8 was fixed to the intermediate member of the second probe using an adhesive tape (not illustrated).

In this way, the first probe of which the tip 7 was covered with the first resin film 6 and the second probe of which the tip 9 was covered with the second resin film 8 were prepared.

(2) Next, a two-dimensional material (hexagonal boron nitride) 10 (length of about 40 µm at the longest portion) left still on a $SiO_2$/Si substrate was heated to a temperature of 55° C. and then picked up using the first probe of which the tip 7 was covered with the first resin film 6 prepared in Step (1).

Figure 3A:
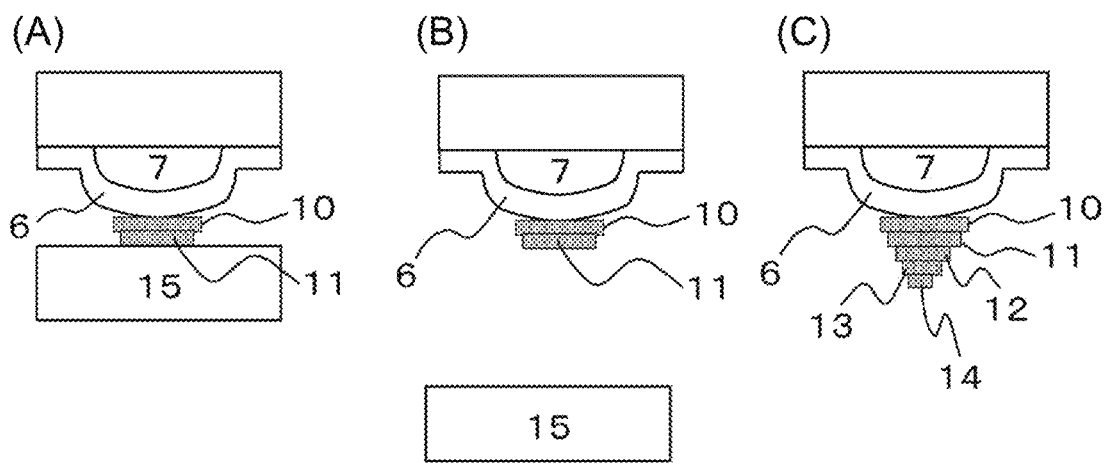
FIG. 3a, A-C is a conceptual diagram illustrating the manipulation procedures (first half) of Example 4 in Examples.

(2-2) Next, a two-dimensional material (hexagonal boron nitride) 11 (left still on a Sift/Si substrate 15) having a slightly smaller area than the two-dimensional material (hexagonal boron nitride) 10 picked up in Step (2) (that is, the area was about 90% of that of the former) was heated to a temperature of 55° C., and then grounded on/pressed against the surface on the opposite side to the first probe of the two-dimensional material (hexagonal boron nitride) 10 (FIG. 3a, A), and picked up from this $SiO_2$/Si substrate 15 (FIG. 3a, B).

The same work was repeated to stack five sheets of two-dimensional materials (hexagonal boron nitride) 10 to 14 (the area decreased in this order) in a mountain shape as a whole and pick up the stack (FIG. 3a, C).

Figure 3B:
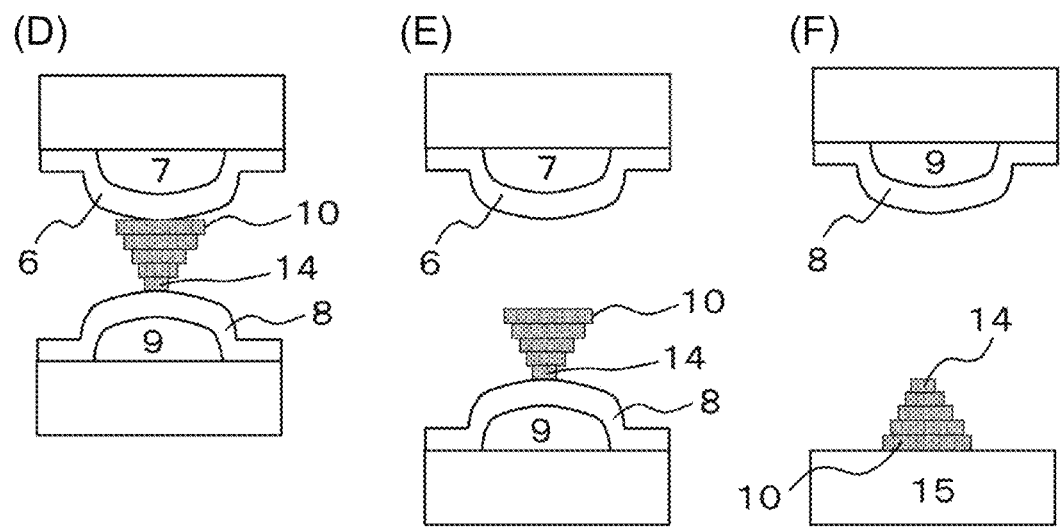
FIG. 3b, D-F is a conceptual diagram illustrating the manipulation procedures (second half) of Example 4 in Examples.

(3) Next, the second probe of which the tip 9 was covered with the second resin film 8 prepared in Step (1) was grounded on the surface on the two-dimensional material (hexagonal boron nitride) 14 side of the stack composed of two-dimensional materials (hexagonal boron nitride) 10 to 14 fabricated in Step (2-2), and pressed (FIG. 3b, D).

At this time, the temperature of the stack composed of two-dimensional materials (hexagonal boron nitride) 10 to 14, the first resin film 6, and the second resin film 8 was controlled at 100° C. by performing heating from the second probe side.

(4) Next, the first probe and the second probe were separated.

The stack composed of two-dimensional materials (hexagonal boron nitride) 10 to 14 picked up by the first probe was transferred to the second probe (FIG. 3b, E).

(5) Next, the second probe was flipped upside down, and the stack composed of two-dimensional materials (hexagonal boron nitride) 10 to 14 was grounded on the surface of the Sift/Si substrate 15 heated to a temperature of 150° C., and pressed.

(6) Subsequently, the second probe and the Sift/Si substrate 15 were separated.

The stack composed of two-dimensional materials (hexagonal boron nitride) 10 to 14 was placed on the surface of the Sift/Si substrate 15 so that the surface on the two-dimensional material (hexagonal boron nitride) 10 side was in contact with the surface of the $SiO_2$/Si substrate 15 (FIG. 3b, F).

In other words, it was possible to place the stack composed of two-dimensional materials (hexagonal boron nitride) 10 to 14 on the surface of the $SiO_2$/Si substrate 15 in a state of being flipped over from that at the time of fabrication.

Reference Example 1-1

A resin film (the polyvinyl chloride-based resin film (β1)) cut in an appropriate size (4 mm×4 mm) was covered so as to cover the tip of a probe, and allowed to self-adhere, and further the end of the resin film was fixed to the intermediate member of the probe using an adhesive tape. The probe is one in the form of which the conceptual diagram is illustrated in FIG. 1. The probe has a glass intermediate member on a metal base, and further a dome-shaped (hemispherical shape with a diameter of 1.5 mm) polydimethylsiloxane tip on the intermediate member. The base has a perforation in the center, and the flake-like material to be manipulated over the probe can be observed through the perforation.

A probe of which the tip was covered with a resin film was grounded on a two-dimensional material (hexagonal boron nitride) left still on a $SiO_2$/Si substrate heated to a predetermined temperature, and pressed, and then the $SiO_2$/Si substrate and the probe were separated, thereby attempting pickup of the two-dimensional material. The trial was repeated 20 times, and the probability of successful pickup was determined.

The surface of the two-dimensional material (hexagonal boron nitride) (length of about 40 μm at the longest portion) picked up by a probe of which the tip was covered with a resin film on the opposite side to the probe side of the two-dimensional material was grounded on the surface of the $SiO_2$/Si substrate heated to a predetermined temperature, and pressed, and then the $SiO_2$/Si substrate and the probe were separated, thereby attempting release of the two-dimensional material. The trial was repeated 20 times, and the probability of successful release was determined.

Table 2 shows the results of the pickup and release probabilities in the trials.

In the table, HP means that the two-dimensional material was picked up at a probability of more than 70%.

mp means that the probability of successful pickup was 30% to 70%.

HR means that the two-dimensional material was released at a probability of more than 70%.

mr means that the probability of successful release was 30% to 70%.

Reference Examples 1-2 to 1-4

Manipulation and pickup/release tests were performed in the same manner as in Reference Example 1-1 except that those shown in Table 2 were used as the resin films (that is, the amount of plasticizer blended was changed). The results are shown in Table 2.

Reference Examples 2-1 to 2-3

Manipulation and pickup/release tests were performed in the same manner as in Reference Example 1-1 except that those shown in Table 2 were used as the resin films (that is, the thickness of resin film was changed). The results are shown in Table 2.

TABLE 2

Evaluation of pickup/release for respective features of resin film

| | | Ref. Ex. 1-1 | Ref. Ex. 1-2 | Ref. Ex. 1-3 | Ref. Ex. 1-4 | Ref. Ex. 2-1 | Ref. Ex. 2-2 | Ref. Ex 2-3 |
|---|---|---|---|---|---|---|---|---|
| Resin film | | β 1 | β 2 | β 3 | β 4 | β 2 | β 3 | β 4 |
| Amount of plasticizer blended: parts by mass | | 120 | 80 | 40 | 0 | 40 | 40 | 40 |
| Thickness: μm | | 1 | 1 | 1 | 1 | 15 | 50 | 100 |
| Substrate temperature (° C.) | 50 | | | | | | | |
| | 55 | | | | | | | mp |
| | 60 | | | | | | | HP |
| | 65 | | | | | | mp | HP |
| | 70 | | | | | | HP | HP |
| | 75 | mp | | | | mp | HP | HP |
| | 80 | HP | mp | | | HP | HP | mp |
| | 85 | HP | HP | mp | | HP | HP | mp |
| | 90 | HP | HP | mp | mp | HP | HP | mp |
| | 95 | HP | HP | HP | mp | HP | mp | mr |
| | 100 | HP | HP | HP | HP | HP | mp | HR |
| | 105 | HP | HP | HP | HP | mp | mr | HR |
| | 110 | mp | HP | HP | HP | mp | HR | HR |
| | 115 | mr | mp | mp | mp | mr | HR | HR |
| | 120 | mr | mr | mr | mp | mr | HR | HR |
| | 125 | HR | mr | mr | mr | HR | HR | HR |
| | 130 | HR | HR | HR | mr | HR | HR | HR |
| | 135 | HR | HR | HR | HR | HR | HR | HR |

From the results shown in Table 2, it has been found that in the case of using a polyvinyl chloride-based resin film as the resin film, the temperature at which a two-dimensional material can be picked up at a high probability and the temperature at which a two-dimensional material can be released at a high probability slightly decrease when the amount of plasticizer blended increases, and further the temperature at which a two-dimensional material can be picked up at a high probability and the temperature at which a two-dimensional material can be released at a high probability greatly decrease when the thickness of resin film increases.

In addition, all of the disclosures of Momoko Onodera et al., 2020 Japanese Journal of Applied Physics 59, 010101 (2020) and Yusai Wakafuji et al., Nano Letters 2020, 20, pp. 2486-2492 are also incorporated as the contents of this specification by reference.

What is claimed is:

1. A method for manipulating a flake-like material, the method comprising:
    (1) a step of preparing a first probe of which a tip is covered with a first resin film and a second probe of which a tip is covered with a second resin film;
    (2) a step of grounding the first probe of which the tip is covered with the first resin film on the flake-like material left still on a substrate, and pressing the first probe to pick up the flake-like material;
    (3) a step of grounding the second probe of which the tip is covered with the second resin film on a surface on an opposite side to the first probe of the flake-like material picked up by the first probe in the step (2), and pressing the second probe; and
    (4) a step of transferring the flake-like material picked up by the first probe to the second probe by separating the first probe and the second probe,
    wherein (i) a thickness ratio (thickness B/thickness A) of a thickness B of the second resin film to a thickness A of the first resin film when pressing is not performed is less than 1.

2. The manipulation method according to claim 1, wherein the thickness ratio (thickness B/thickness A) is 0.8 or less.

3. The manipulation method according to claim 1, wherein the flake-like material is a two-dimensional material.

4. The manipulation method according to claim 1, wherein the first resin film and the second resin film are each a polyvinyl chloride resin film.

5. The manipulation method according to claim 4, wherein
the tip of the first probe and the tip of the second probe are each made from a silicone resin, and
the flake-like material is graphene or hexagonal boron nitride.

6. The manipulation method according to claim 1, wherein
the first resin film is formed from a polyvinyl chloride resin containing (A-a) 100 parts by mass of a polyvinyl chloride resin and (A-b) α parts by mass of a plasticizer, and
the second resin film is formed from a polyvinyl chloride resin containing (B-a) 100 parts by mass of a polyvinyl chloride resin and (B-b) β parts by mass of a plasticizer,
where the α and the β meet the condition: α>β.

7. A method for producing an article containing a flake-like material,
the method comprising manipulating the flake-like material using the manipulation method according to claim 1.

8. A method for producing an article containing a flake-like material,
the method comprising manipulating the flake-like material using the manipulation method according to claim 2.

9. A method for producing an article containing a flake-like material,
the method comprising manipulating the flake-like material using the manipulation method according to claim 3.

10. A method for producing an article containing a flake-like material,
the method comprising manipulating the flake-like material using the manipulation method according to claim 4.

11. A method for producing an article containing a flake-like material,
the method comprising manipulating the flake-like material using the manipulation method according to claim 5.

12. A method for producing an article containing a flake-like material,
the method comprising manipulating the flake-like material using the manipulation method according to claim 6.

* * * * *